Patented Dec. 19, 1933

1,940,009

UNITED STATES PATENT OFFICE 1,940,009

MAKING OF GOLF BALLS

Alexander Munro, Belleville, N. J., assignor to St. Mungo Manufacturing Company of America, Newark, N. J., a corporation of New Jersey No Drawing. Application April 18, 1931
Serial No. 531,258

12 Claims. (Cl. 154—17)

This invention relates to the manufacture of golf balls.

Broadly in the practice of my invention I mill a batch of cover stock, this milled material then being applied to the ball core which may be composed for example of a center about which rubber thread is wound under tension, and the ball is then placed in a mould and subjected to heat and pressure under conditions preclusive of vulcanization to shape the cover and press the same firmly into engagement with the core. The ball is then removed from the mould and the cover vulcanized.

More specifically in the practice of my invention I mill a batch of cover stock comprising rubber, balata, gutta percha or a mixture of any or all of these materials, about 1% of sulphur as a vulcanizing agent, a suitable coloring pigment and zinc oxide, the batch, however, being free of an accelerator of any kind.

By way of example the composition of the cover stock may be:—

| | Percent |
|---|---|
| Balata | 57.0 |
| Rubber | 28.5 |
| Sulphur | .85 |
| Zinc oxide | .85 |
| Calcium base | 12.8 |

This milled material is then applied to the ball core and the ball placed in a mould where it is subjected to heat and pressure under conditions preclusive of vulcanization, to shape the cover and to press the same firmly into engagement with the core. The average temperature employed in the moulding operation is about 220° F. and the heat is kept on the mould three minutes or thereabouts. It will be appreciated, as above mentioned, that the moulding operation is carried out under conditions preclusive of vulcanization owing to the temperature employed and the short time the heat is maintained on the mould.

The ball is then removed from the mould and immediately or at any convenient stage thereafter immersed in a dilute accelerator solution, for example, a 5% solution. The accelerator or catalyst employed is of such a character as to function at relatively low temperatures, for example, between 100 to 105° F. A suitable accelerator is an accelerator of the dithiocarbamic acid series such, for example, as piperidine pentamethylene dithiocarbamate produced by reacting carbon bisulfide with piperidine. The accelerator solvent employed is preferably a material which will evaporate rapidly such as benzol or gasoline or other organic solvent but in any event a material which will not be injurious to the stock of the ball cover.

After the application of the accelerating fluid the ball is allowed to stand until the solvent has evaporated and thereupon or at any convenient time thereafter the ball is placed in an oven or other suitable chamber where it is subjected to the action of a controlled elevated temperature sufficiently high to cause the accelerator to function, for example, 100 to 105° F. for three days or thereabouts.

The ball may then be painted or subjected to any other finishing operation. This finishing operation may be performed immediately after this vulcanizing operation or at any convenient stage thereafter.

It will be seen from the foregoing that the present invention provides a method to be employed in the making of golf balls in which the moulding of the cover is performed under conditions preclusive of vulcanization, the entire vulcanizing operation being effected after removal of the balls from the moulds.

In the practice of the method of this invention the time elapsing between the removal of the balls from the moulds and the application of the accelerator solution or fluid to the balls may be varied within wide limits in that the balls may be treated immediately after their removal from the moulds or allowed to stand for days, if desired.

The time elapsing between the end of the vulcanizing operation and the application of the paint or other finishing material may be varied also within wide limits in that the balls may be finished immediately after vulcanizing or they may be allowed to stand for days until the demands on the manufacturer may require their being finished.

Derivatives of carbon bisulfide other than the accelerator of the dithiocarbamic acid series specifically mentioned above may be employed with good results. For example, the reaction products of carbon bisulfide with the condensation product of an amine and an aldehyde give excellent results.

The length of the vulcanizing operation as well as the temperatures employed will depend upon the accelerator and the strength of the accelerating solution, the stronger the accelerator the lower the temperature and the shorter the vulcanizing period employed.

What I claim is:—

1. In the making of golf balls the method which comprises moulding a cover of vulcanizable material upon a ball core under controlled heat and pressure conditions preclusive of vulcanization, removing the ball from the mould, applying an accelerating fluid to the cover and then vulcanizing the cover.

2. In the making of golf balls the method which comprises moulding a cover of vulcanizable material upon a ball core under controlled heat and pressure, conditions preclusive of vulcanization, removing the ball from the mould, immersing the ball in a solution of an accelerator and an organic solvent, and then vulcanizing the cover.

3. In the making of golf balls the method which comprises moulding a cover of vulcanizable material upon a ball core under controlled heat and pressure, conditions preclusive of vulcanization, removing the ball from the mould, applying a five percent solution of an accelerator and an organic solvent to the cover, and then vulcanizing the cover.

4. In the making of golf balls the method which comprises moulding a cover of vulcanizable material upon a ball core under controlled heat and pressure, conditions preclusive of vulcanization, removing the ball from the mould, dipping the ball in a five percent solution of an accelerator and an organic solvent, and then vulcanizing the cover.

5. In the making of golf balls the method which comprises moulding a cover of vulcanizable material upon a ball core under controlled heat and pressure conditions preclusive of vulcanization, removing the covered ball from the mould, applying to the cover an accelerator which is a derivative of carbon bisulfide in solution in an organic solvent, and then vulcanizing the cover.

6. In the making of golf balls the method which comprises moulding a cover of vulcanizable material upon a ball core under controlled heat and pressure conditions preclusive of vulcanization, removing the covered ball from the mould, applying to the cover an accelerator produced by reacting carbon bisulfide with the condensation product of an amine and an aldehyde in solution in an organic solvent, and then vulcanizing the cover.

7. In the making of golf balls the method which comprises moulding a cover of vulcanizable material upon a ball core under controlled heat and pressure conditions preclusive of vulcanization, removing the covered ball from the mould, applying to the cover an accelerator of the dithiocarbamic acid series in solution in an organic solvent, and then vulcanizing the cover.

8. In the making of golf balls the method which comprises moulding a cover of vulcanizable material upon a ball core under controlled heat and pressure conditions preclusive of vulcanization, removing the ball from the mould, applying piperidine pentamethylene dithiocarbamate in solution in an organic solvent to the ball cover, and then vulcanizing the cover.

9. In the making of golf balls the method which comprises moulding a cover of vulcanizable material upon a ball core under controlled heat and pressure conditions preclusive of vulcanization, removing the ball from the mould, immersing the covered ball in an accelerator produced by reacting carbon bisulfide with the condensation product of an amine and an aldehyde in solution in an organic solvent, and then vulcanizing the cover.

10. In the making of golf balls the method which comprises molding a cover of vulcanizable material upon a ball core under controlled heat and pressure conditions preclusive of vulcanization, removing the ball from the mould, applying to the ball a five percent solution of an organic solvent and an accelerator produced by reacting carbon bisulfide with the condensation product of an amine and an aldehyde, and then vulcanizing the cover.

11. In the making of golf balls the method which comprises moulding a cover of vulcanizable material upon a ball core under pressure and at an average temperature of about 220° F. for not substantially in excess of three minutes, removing the ball from the mould, applying a five percent solution of an organic solvent and an accelerator which is a derivative of carbon bisulfide to the cover, and then subjecting the cover to a temperature between 100 to 105° F. to vulcanize the cover.

12. In the making of golf balls the method which comprises moulding a cover composed of the following substances in approximately the following proportions: balata 57.0%, rubber 28.5%, sulphur .85%, zinc oxide .85%, calcium base 12.8% on a ball core of tense rubber thread under pressure and at an average temperature of about 220° F. for approximately three minutes, removing the ball from the mould, applying to the cover an approximately five percent solution of an organic solvent and a carbon bisulfide derivative accelerator, and then subjecting the cover to a temperature between 100 to 105° F. to vulcanize the cover.

ALEXANDER MUNRO.